6741X
J. Tinkler.
Cheese Press.
Patented Aug. 31, 1831.
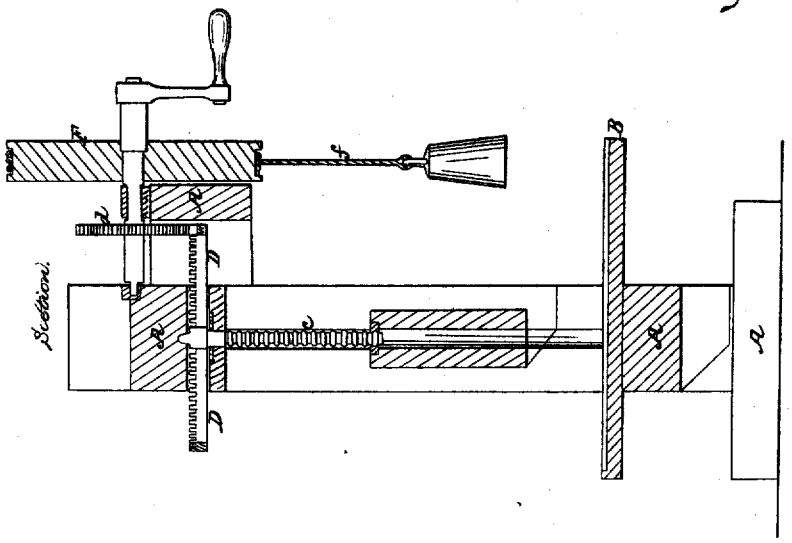
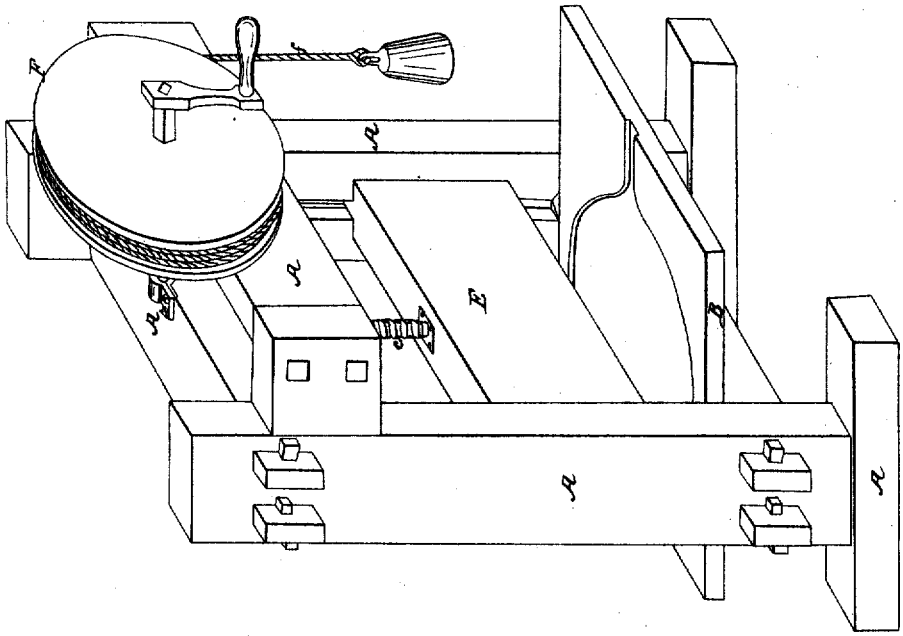
AM. PHOTO-LITHO. CO. N.Y. (OSBORNE'S PROCESS)

Aug. 31. 1831

6741X

Joseph Tinkler

Letters Patent.

The schedule referred to in these Letters Patent and making part of the same containing a description in the words of the said Joseph Tinkler himself of his Improvement in the Art of Pressing —

Be it known that I the said Joseph Tinkler, have invented, constructed and applied to use a new and useful improvement in the application of the wheel, Pinion and crank or pulley to the screw in Pressing. The said press containing said improvement and of a convenient size and power for pressing Cheese is specified in the words following viz. Construct a frame in the following manner, make two pieces for the feet, fifteen inches long two & a fourth inches thick & two & three fourths inches deep — exactly in the centre of which, make a mortise five and one half inches long, and one inch wide; into these feet frame two posts two feet ten inches in length clear of the tenons, five & one half inches wide, & two & one fourth inches thick, in such a manner that they will incline forward three fourths of an inch in their whole length, where liquor is to be pressed; otherwise their position will be at right angles with the feet. Two and three fourths inches from the shoulder of the tenons make two mortises parallel to each other through each of these posts three inches long, one inch wide leaving a space of one and three fourths inches between them, also within three inches of the upper end of the posts, make two similar mortises, then on the inside of said posts two inches below the upper mortises and exactly under the same, make two mortises of one inch square and one inch deep, also on the inside of the posts, make a groove one inch wide and three fourths inches deep, extending from the lower edge of the small mortises, to within one inch of the upper edge of the first described mortises, and exactly in the centre of the posts, These posts are connected by three pieces of timber, two of which called beams are five & half inches wide, three inches thick, and fifteen inches long from shoulder to shoulder with tenons corresponding with the aforesaid mortises of a sufficient length to admit of a key on the outside of the posts; the other of the same length and width of the beams one inch thick with tenons corresponding wi[th]
the small mortises in the posts. —— On the front side of each post in the centre
thereof and within six inches of the upper end, is made a mortise three inches long,
one inch wide and two inches deep; into these mortises, frame two pieces five &
half inches wide, five inches long and two & one fourth inches thick, by tenons pro-
jecting from the centre of the under edges of said pieces, and corresponding with
said mortises, within one inch of the outer end of each of these pieces, and within
three fourths of an inch of each edge, make a mortise through the same of one inch
square — let the ends of these two pieces be connected by a piece fifteen inches in
length from shoulder to shoulder, five & half inches wide, two inches thick, with
two tenons at each end corresponding with the mortises in the pieces last des
cribed so as the front side of said pieces may exactly correspond with the ends
of the aforesaid pieces. —— Construct a platform fifteen inches wide
eighteen inches long, and one inch thick. this fasten on the upper side of
the lower beams of the press, so as to project three inches more to the front side
than to the rear. On the upper side of said platform cut a circular
niche, whose centre should be exactly in the centre of the press, and whose
diameter is fourteen inches, diverting from the regular periphery of said circle
so as to conduct the liquid to the front side of the press; construct a screw of
wrought iron eleven inches long, let nine inches of the same be turned, to seven
eighths of an inch thick. On this part cut a thread eight inches leav
ing one inch round and smooth, the next inch on the same to be square, for
the purpose of admitting a cog wheel, the balance projecting above said wheel,
must be turned nearly to a point to prevent friction in pressing, which
point is placed against a step or plate of iron or steel fastened in the cen
tre of the lower side of the upper beam of the press. —
For the purpose of a collar to support the screw, take an iron plate of two &
half inches square, one eighth inch thick; in the centre of which is a hole suf
ficiently large to admit the neck of the screw, this plate is fastened on the
upper side of the small piece below the upper beam of the press, the hole
of the collar, to correspond with a hole through the centre of said piece to
admit the screw, To this screw is suspended a follower by
means of a nut fastened into the upper side of it. fifteen inches long from shoulder to shoulder, eight inches high, and three inches thick; with tenons at each end, corresponding with the groove on the inside of the posts. —

Through the centre of the follower corresponding with the centre of the nut bore a hole of sufficient size to admit the screw to pass freely. — On the square part of the screw, fasten firmly a cast iron cog wheel, twelve inches in diameter, with the cogs on the upper side for the purpose of turning it, with a verticle spur wheel or pinion: This verticle wheel is six inches in diameter, and of cast iron with a square hole in the centre, for the purpose of admitting a wrought iron gudgeon, this gudgeon is eight and a half inches long, one end is turned and works in a box placed upon the top of the upper beam near the edge then from that end measure five & half inches towards the other and there turn another part for the purpose of working in a box, fastened in the centre of the upper side of the piece extending across the front side of the press. — This gudgeon is placed horizontally in such a manner as to admit the verticle wheel which is fastened firmly upon it to mash regularly into the horizontal wheel on the head of the screw, Two inches of the square part of this gudgeon will project over the front side of the press, for the purpose of admitting a pulley, by which the press is moved; this pulley is thirteen inches in diameter, and so turned that it will admit of a cord to pass round it, to which a weight is suspended when it is required to continue the pressure, Into the front side of this pulley and near the verge of the same put a handle, projecting three inches from the pulley.

Application.

The method of using this press is simply to place the article to be pressed upon the platform, then by turning the pulley with the hand the screw is caused to turn, by which means the follower is forced to slide down the groove on the inside of the posts. If after turning with the hand it is required to continue the pressure, suspend a weight to the pulley by a cord. — The same principle will hold good with any number of screws by connecting them with cog wheels at the heads. I would also hereby observe that the proportions may be varied according to the nature of the article to be pressed and the quantity of power required. The foregoing specification relates to a machine sufficiently powerful for the pressing of Cheese, but that of a machine sufficiently large for pressing Cider let the horizontal wheel be enlarged to four or more feet if required and the screw in proportion.

Joseph Tinkler.

Witnesses { John Everhard
{ Thomas Blackburn

14/10 1/2

Eg
CAGW